United States Patent [19]
Golik

[11] Patent Number: 5,162,705
[45] Date of Patent: Nov. 10, 1992

[54] DYNAMIC FOCUSSING CIRCUIT FOR CATHODE RAY TUBE AND TRANSFORMER FOR USE THEREIN

[75] Inventor: Stephen S. Golik, Knoxville, Tenn.

[73] Assignee: North American Philips Corporation, New York, N.Y.

[21] Appl. No.: 800,891

[22] Filed: Nov. 27, 1991

[51] Int. Cl.$^5$ .............................. H01J 29/58
[52] U.S. Cl. ..................................... 315/382
[58] Field of Search ............... 315/382, 371, 382.1

[56] References Cited

U.S. PATENT DOCUMENTS

| | | | |
|---|---|---|---|
| 3,906,303 | 9/1975 | Gerritsen | 315/370 |
| 3,906,305 | 9/1975 | Nillesen | 315/399 |
| 3,944,884 | 3/1976 | Wilocki | 315/370 |
| 4,642,530 | 2/1987 | Rodriguez-Cavazos | 315/400 |
| 5,071,161 | 12/1991 | Ikeda et al. | 315/371 |

FOREIGN PATENT DOCUMENTS

| | | |
|---|---|---|
| 2017178 | 2/1978 | Fed. Rep. of Germany . |
| 63-163882 | 6/1988 | Japan . |
| 62-267156 | 4/1989 | Japan . |
| 908755 | 10/1962 | United Kingdom . |

Primary Examiner—Theodore M. Blum
Attorney, Agent, or Firm—William Squire

[57] ABSTRACT

A diode modulation circuit provides a horizontal yoke coil current which is modulated in a manner to correct for side pin cushion distortion in the resultant CRT television picture tube display. The modulation circuit includes two parallel capacitance-inductance resonant circuits coupled in series. One coil of the parallel resonant circuits is the horizontal yoke coil of the picture tube. A modulation circuit is applied to the coil of the other parallel resonant circuit to generate a modulation current in the yoke coil. The modulation current flowing through the yoke coil is applied to the primary winding. Another modulated current in the diode modulator circuit is applied to a secondary winding of a transformer, the windings being coupled to each other via a common core. The turns ratio of the primary winding to the secondary winding of the transformer are such as to add the fluxes generated by the windings to produce a net flux in the transformer core that exhibits negligible modulation. A ramp current of constant maximum amplitude is induced in the output winding of the transformer by that flux and is applied to an output capacitor circuit for producing an unmodulated periodic parabolic voltage for driving the focusing grid of the CRT.

19 Claims, 3 Drawing Sheets

DYNAMIC FOCUSSING CIRCUIT FOR CATHODE RAY TUBE AND TRANSFORMER FOR USE THEREIN

This invention relates to a circuit for focussing an electron beam generated in a cathode ray tube having a television display screen.

In a cathode ray tube display device, the radius of deflection of the electron beam generating the display on the display screen of the tube is generally not the same as the radius of curvature of the display screen. Presently, the display screens of cathode ray tubes (CRT) are becoming generally more planar thus having a relatively large radius of curvature relative to that of the electron beam. Typically, the trend today is to make the display tube as short as possible, therefore, reducing the radius of the electron beam while at the same time the trend is to flatten the display screen and therefore increasing its radius. Further, screen size, that is overall dimensions of the display are also being made increasingly larger. As a result, the disparity between the radius of the electron beam and that of the display screen is becoming more significant. Because of these differences in radii, the electron beam is required to travel a much greater path to the edges of the screen than it does to the center of the screen.

The electrons in an electron beam, as known, tend to spread proportionally with the distance travelled resulting in a defocusing effect at the screen edges. The defocusing effect therefore becomes emphasized as the relative size or flatness of the screen increases and as the beam radius of deflection decreases. To correct this defocusing problem, a voltage which varies with the angle of deflection is added to the static focus voltage applied to the electron beam. This correction voltage is known as a dynamic focusing voltage. The defocusing phenomena is a function of the square of the distance from the center of deflection of the electron beam. Consequently, the dynamic correction voltage is generally parabolic in shape, with increasing magnitude of the voltage occurring at the edges of the screen in order to provide more uniform focusing of the beam on the screen. Thus for every scan line, the parabolic voltage applied to the scan line signal has parabolically increasing magnitudes at the ends of each scan line and parabolically decreasing magnitude at the center of the scan line. The scan line is generated by a scan line ramp current applied to the horizontal yoke coil. Circuits for generating such parabolic focusing voltages are shown in FIGS. 1a and 1b respectively illustrating voltage driven and current driven circuits.

A diode modulator is utilized in television receivers with relative large, for example 110°, deflection angles for correction of side pin cushion raster distortion. A description of one such diode modulator is given in U.S. Pat. No. 3,906,305. The side pin cushion raster distortion when observed uncorrected, causes the raster to have an hour glass shape. That is, the scan lines in the center of the screen are shorter in length than the scan lines at the top and bottom of the screen. The diode modulator circuit corrects for this distortion by increasing the horizontal yoke current at the center of the raster and decreasing the horizontal yoke current at the top and bottom edges of the display on the screen. Such a circuit, for example is illustrated in FIG. 2 herein which will be described below in the detailed description.

The modulation of the yoke horizontal current results in the horizontal yoke current waveform having a vertical rate (60 Hz) modulation. The horizontal yoke coil deflection beam ramp current applied to the horizontal yoke coil is utilized in accordance with the embodiment of FIG. 1b to generate a dynamic focus voltage. However, because that yoke coil ramp current is modulated, this modulation tends to be carried through to the dynamic focussing voltage generated therefrom providing a modulated periodic parabolic focusing grid voltage. This modulation of the dynamic focussing voltage is undesirable. Because of this modulation of the focusing voltage, the electrons of the electron beam will not be uniformly focused on the screen at the edges of the display in the different scan lines causing a variable focusing effect at the screen edges. Such a defocusing of the display is undesirable.

A circuit for producing a dynamic focusing voltage for a cathode ray tube raster scan beam deflection yoke, the tube having a face for receiving the scan beam for generating a raster scan picture on the face in response to the beam incident thereon according to the present invention comprises a diode modulation circuit for modulating a beam deflection current applied to the yoke for scanning the beam on the face of the tube to correct pin cushion distortion in the picture. Means are responsive to the modulated current for producing a substantially unmodulated beam focussing voltage from the modulated current. In accordance with one embodiment of the present invention, the means for producing a substantially unmodulated beam focussing voltage includes 1) a transformer including a core, a first winding coupled to the core for receiving the modulated current and second and third windings coupled to the core and first winding via the core and 2) capacitive means coupled to the third winding for generating a periodic dynamic focussing voltage in accordance with the value of flux produced in the core by the first and second windings. The first and second windings have a relative turns ratio such that the flux in the core coupled to the third winding remains substantially constant regardless of the presence of modulation of the modulated current.

IN THE DRAWING

DESCRIPTION OF THE PREFERRED EMBODIMENT

Figure 1A:
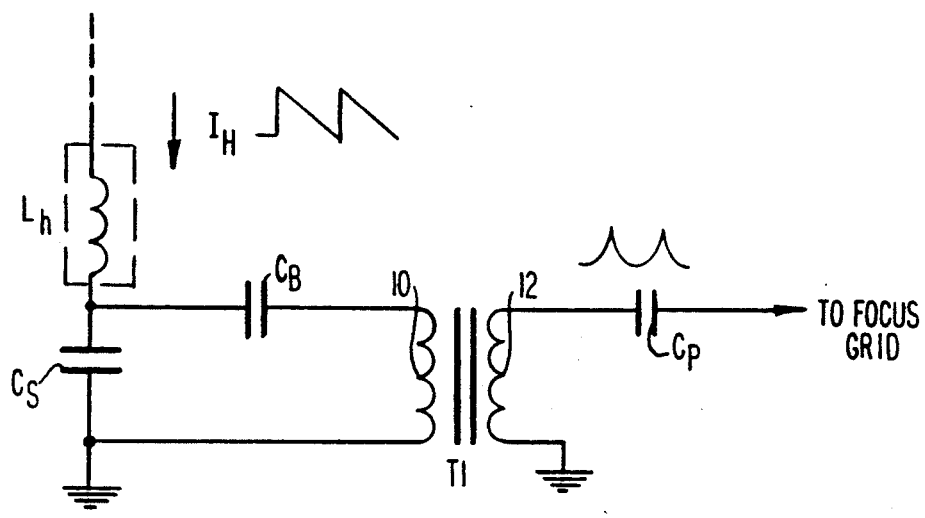
FIGS. 1a and 1b are representative prior art circuits of respective voltage driven and current driven dynamic grid focus voltage generating circuits.

In the different figures, components with the same reference numerals are identical. In FIG. 1a, a prior art voltage driven circuit for generating a periodic parabolic focussing waveform includes a horizontal yoke coil $L_h$ which receives a ramp scan current $I_H$ from a source (not shown) in a typical television receiver. The coil $L_h$ is the horizontal yoke coil, for example, in a cathode ray tube used as a display in a television receiver. Each ramp of the current $I_H$ is used to generate a scan line of the deflected electron beam generating the display in the CRT. The current outputted from the coil $L_h$ is applied to a reference potential through a capacitor $C_S$. A periodic parabolic voltage waveform is generated across the capacitor $C_S$. A transformer T1 has a primary winding 10 which is connected in series with a DC blocking capacitor $C_B$ across capacitor $C_S$. The secondary winding 12 of the transformer has one end coupled to ground and the other end coupled to the CRT grid circuit which receives the dynamic focusing voltage through DC blocking capacitor $C_P$. $C_P$ typically has a rating value of 15 kv and applies the periodic parabolic waveform to the cathode ray tube grid for focusing the scanning electron beam.

Figure 1B:
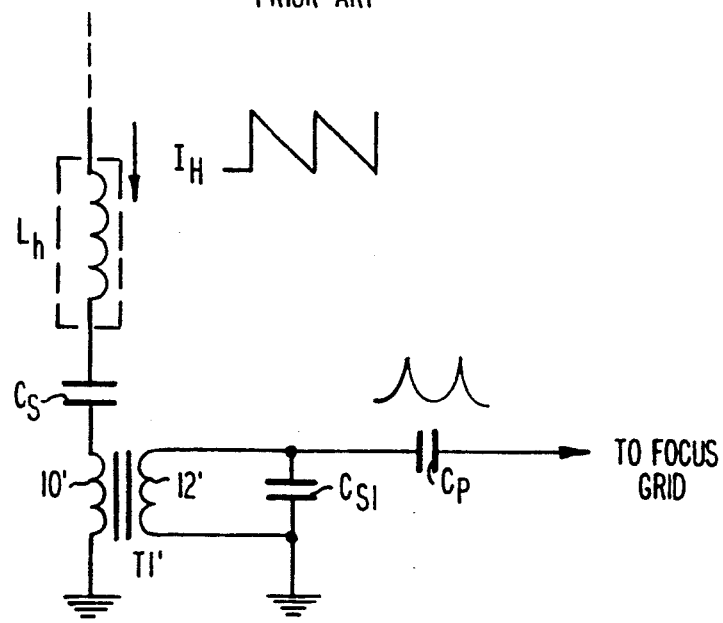

In FIG. 1b, a transformer T1' has its primary winding 10' connected to one side of capacitor $C_S$ and the other side to ground. The secondary winding 12' has one end connected to ground. A parabolic waveform generating capacitor $C_{S1}$ is coupled across the winding 12'. Capacitor $C_P$ which couples the periodic parabolic voltage is connected between the junction of winding 12' and capacitor $C_{S1}$ and the output of the circuit.

In operation of the circuit of FIG. 1b by way of example, the ramp current $I_H$ is applied to the horizontal yoke coil $L_h$ through capacitance $C_S$ and winding 10' to ground. Transformer T1' steps down the current in winding 10' to produce a reduced ramp current in winding 12'. Capacitor $C_{S1}$ produces a parabolic waveform from the ramp current in winding 12'. DC blocking capacitor $C_P$ passes the periodic parabolic focusing voltage to the CRT grid.

Figure 2:
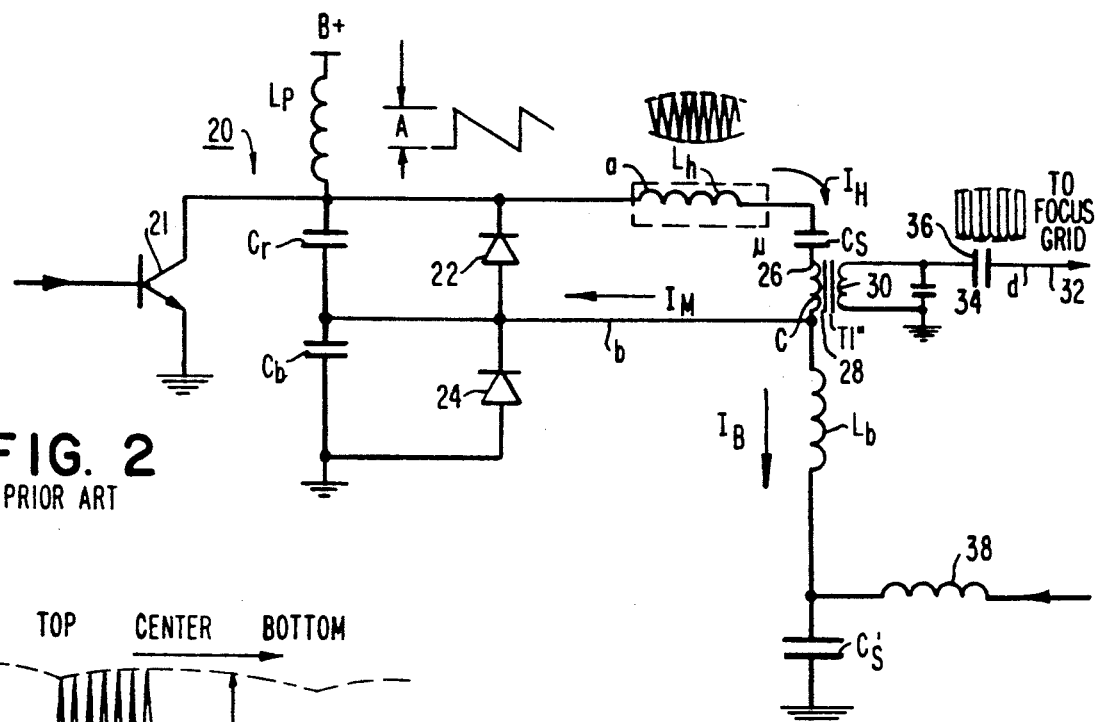
FIG. 2 is a circuit diagram of a prior art diode modulating circuit for modulating the horizontal yoke coil scan line current to correct for pin cushion distortion.

Typically, the current $I_H$ is a sawtooth current of a given maximum amplitude. However, as mentioned in the introductory portion, the resultant amplitude ramp current for creating the horizontal scan lines results in the pin cushion effect in the display such that the scan lines are foreshortened in the center portion of the display screen. To correct for this pin cushion effect caused by typical yoke designs, the diode modulating circuit of FIG. 2 is provided as described in more detail in U.S. Pat. No. 3,906,305.

The circuit 20 of FIG. 2 includes an NPN transistor 21 which operates like a switch and together with coil $L_p$ coupled to a voltage source B+, and coil $L_h$ produce current $I_H$. For example, transformer T1 in this embodiment switches at 15,734 Hz (the horizontal frequency) or every 63.55 μsec. The emitter is coupled to ground and the collector is connected to the junction of parallel resonant circuit capacitor $C_r$, coil $L_p$ and horizontal yoke coil $L_h$. Diode 22 has its cathode connected to the junction of capacitor $C_r$ and coil $L_h$ and its anode connected to the junction of capacitance $C_r$ and a second capacitor $C_b$. A second diode 24 has its cathode connected to the anode of diode 22 and its anode connected to the other side of capacitor $C_b$. The coil $L_h$ is connected to one end of the primary winding 26 of current step up transformer T1" through a DC blocking coupling capacitor $C_S$. The other end of the winding 26 is connected to the junction of diodes 22 and 24 and capacitors $C_r$ and $C_b$. The junction of the winding 26 with the diodes 22 and 24 is connected to ground through an inductance $L_b$ serially connected with coupling capacitor $C_S'$. Transformer T1" has a core 28 to which is coupled a secondary winding 30. The secondary winding is coupled to output 32 in a current driven configuration as illustrated in FIG. 1b. In this configuration a capacitor 34 is connected across winding 30 to generate the periodic parabolic waveform and output coupling capacitance 36 applies it to the focussing grid voltage on output 32.

An injection coil 38 receives an incoming signal to inject a modulating waveform to the capacitor $C_S'$. This waveform modulates the current $I_H$ applied to the horizontal yoke coil $L_h$. Modulation of the current applied to the coil $L_h$ is of a direction and magnitude so as to correct for the pin cushion distortion mentioned in the introductory portion. The horizontal dynamic focus parabolic voltage thus generated has a vertical rate (60 Hz) modulation because of the modulation of the horizontal yoke current.

Figure 3A:
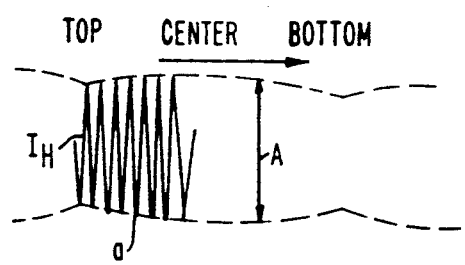
FIGS. 3a, 3b, 3c and 3d illustrate waveforms produced at different points in the circuit of FIG. 2.
Figure 3D:
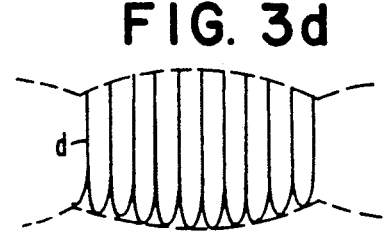
Figure 3B:
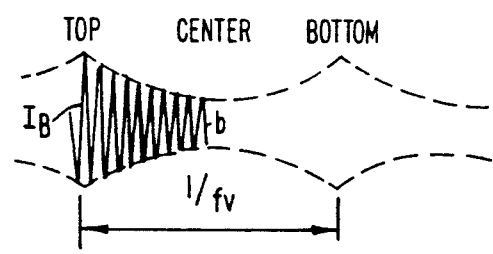
Figure 3C:
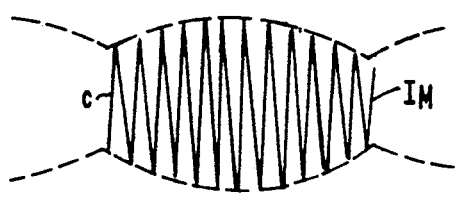

FIG. 3a illustrates the modulation of the ramp current $I_H$ waveform a, the modulation envelope being illustrated by the dashed lines. The ramp current $I_H$ for generating the scan lines is illustrated by the solid lines. The scan lines are modulated so that the modulation amplitude A varies in a periodic manner as shown. This current is applied to the primary winding 26 of transformer T1" producing the waveform c, FIG. 3c, in winding 26. The modulated current for winding 26 induces a modulated current in the winding 30 of transformer T1'. Modulation of the current in winding 30 produces a modulated periodic parabolic voltage waveform across capacitor 36 as illustrated in FIG. 3d. The amplitude of each of the individual parabolas of the waveform in a given period differs from one another as shown. This voltage when applied to the focusing grid of the CRT results in undesirable defocusing of the display at the display edges as previously described.

In FIG. 2, the coil $L_b$ and capacitor $C_b$ form a second parallel resonant circuit tuned to the same frequency as the parallel resonant circuit formed by capacitor $C_r$ and coil $L_h$, the two resonant circuits being in series. Current $I_B$ in coil $L_b$ is subtracted from the current $I_H$ in coil $L_h$ to produce a modulation current $I_m$. Current $I_H$ is lower in value at the top and bottom of the display screen than at the center of the screen. In contrast, the current $I_B$ has the opposite characteristic. Current $I_B$ has a smaller value at the center of the screen than it has at the screen edges. Also, the degree of modulation of the current $I_B$ is greater than that of the modulation of the current $I_H$. This is illustrated by comparison of FIGS. 3a and 3b. The modulation frequency of the waveforms of 3a–3d is $1/f_v$ where f is the frequency of the vertical scan rate, which typically is 60 hertz.

Figure 4:
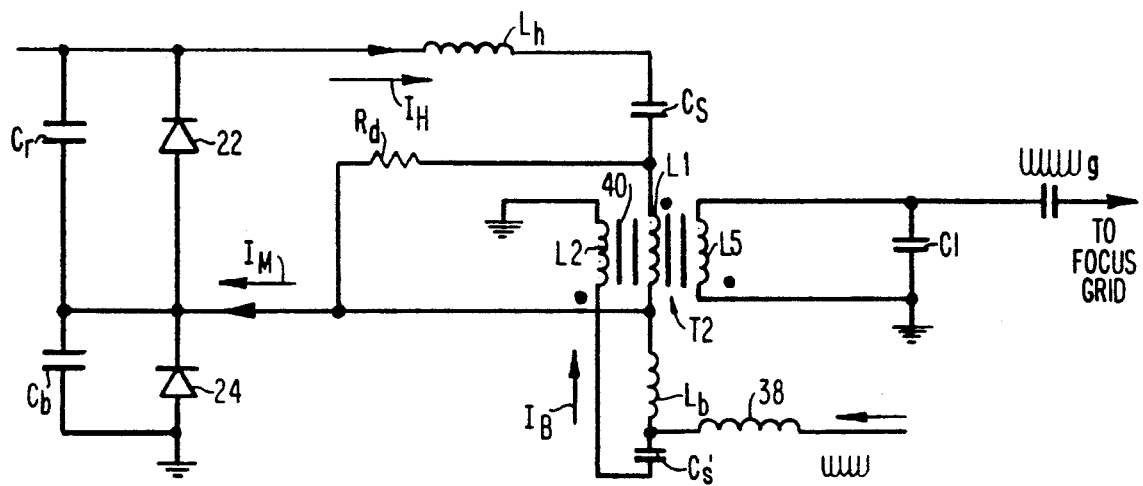
FIG. 4 is a circuit diagram of a diode modulation and dynamic focusing grid voltage generating circuit in accordance with one embodiment of the present invention.

Modulation of the grid focusing voltage waveform d, FIG. 3d, is removed by the circuit in accordance with one embodiment of the invention illustrated in FIG. 4. In FIG. 4, the two parallel circuits comprising capacitor $C_r$ and coil $L_h$ forming one resonant circuit and capacitor $C_b$ and coil $L_b$ forming a second resonant circuit in series with the first circuit are the same as shown in FIG. 2. However, a transformer T2 is used in place of the transformer T1' of FIG. 2. The transformer T2 has a primary winding L1 connected in series with coupling capacitor CS and coil $L_h$. Capacitor $C_S'$ connected to the other side of coil $L_b$ is connected to ground potential through a second winding L2 of the transformer T2. The windings L1 and L2 are coupled via core 40 of the transformer T2. In this arrangement the current $I_B$ from coil $L_b$ and capacitor $C_S'$ flows through the winding L2 to ground. The turns ratio of windings L1 and L2 is significant.

The current flowing in winding L1 flows in a direction opposite the current flowing through winding L2 relative to the core 40. The turns ratio of the winding L1 to winding L2 is set such that the flux created in the core 40 by these currents remains constant in the presence of the modulation of the current through winding L1 and through winding L2. The modulation of the current applied to winding L1 produces a modulation of the flux in core 40. However, the modulating current applied to winding L2 produces a flux that is added to the modulation of the flux created by winding L1. The relative magnitude of these fluxes is determined by the turns ratio of the two windings such that the modulation of one winding flux added to the modulating flux created by the other winding is a constant value. By adding the current $I_B$ to the current $I_H$ via the transformer T2, the resultant net flux has relatively negligible modulation.

In this case, the degree of modulation of the current $I_B$ is greater than that of current $I_H$. Current $I_B$ is therefore reduced until it equals the vertical rate modulation of $I_H$. By transformer T2 combining the two waveforms $I_B$ and $I_H$, a ramp current is produced in winding L5 that is unmodulated. Thus, the currents $I_H$ and $I_B$ are combined in transformer T2 magnetically via the flux in core 40. The flux is equal to the sum of the algebraic currents combined proportionally. Therefore, the number of turns of winding L1 and of winding L2 are set in accordance with the value of the current supplied thereto to algebraically add the flux modulations created by each of the windings so as to effectively produce a net constant maximum amplitude periodically varying flux.

Figure 5:
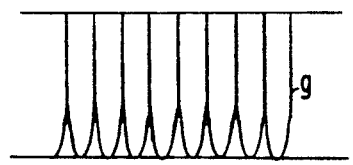
FIG. 5 illustrates a waveform at the output of the circuit of FIG. 4.

For example, in one implementation, the winding L1 may comprise 12 turns as compared to winding L2 having 4 turns. However, the ratio of the modulation amplitude of the current in winding L1 to the modulation amplitude of the current in winding L2 is assumed 1:3. The current in winding L1 may have a value of 6.0 to 6.8 A and the current in winding L2 may have a value of 1.35 to 3.75 A. The windings are made of the same wire. The actual turns ratio between windings L1 and L2 is determined by the amplitude modulation ratio between the currents $I_H$ and $I_B$ applied respectively to the windings L1 and L2. The amplitude modulation of current IB is greater than that of current $I_H$, thus more turns are provided the winding L1 receiving current $I_H$, as compared to the number of turns in winding L2 receiving current $I_B$. The flux in the core of transformer T2 is determined by the ampere turns. This is determined by $n \times I$, where n is the number of turns and I is the current flowing through the turns. Adding the ampere turns of each of the windings produces the total net flux in the core. Making the flux in the core 40 relatively constant and removing the modulation, the waveform across the output winding $L_S$ of transformer T2 is a periodic ramp current of constant maximum amplitude. This current results in a periodic output parabolic waveform without modulation as illustrated in FIG. 5, waveform g.

A resistance $R_d$ is connected to the junction of capacitor $C_S$ and winding L1 and the junction of diodes 22, 24 and windings L1, $L_b$. This resistance reduces the Q of the tuned circuit to reduce ringing and oscillation in the circuit.

What is claimed is:

1. A dynamic focussing circuit for generating a voltage to compensate for differences in radius of deflection of a cathode ray tube (CRT) electron beam and radius of curvature of the CRT display surface, said focussing circuit being responsive to a periodic modulated raster scan current applied to the yoke of said CRT, said raster scan current and focussing circuit for use in producing a CRT display picture, said periodic modulated current having a varying amplitude modulation envelope arranged for correcting pin cushion distortion of the resulting display picture, said dynamic focussing voltage being undesirably modulated by said modulated current, said focussing circuit comprising:
   means for producing said modulated raster scan current; and
   dynamic focussing voltage generating means responsive to said produced modulated raster scan current for generating a substantially unmodulated periodic parabolic dynamic focussing voltage.

2. The dynamic focussing circuit of claim 1 wherein said generating means includes 1) a transformer including a core, a first winding coupled to the core for receiving said modulated current and second and third windings coupled to said core and first winding via said core and 2) capacitance means coupled to said third winding for generating a periodic dynamic focussing voltage in accordance with the value of flux produced in said core by said first and second windings, said first and second windings having a relative turns ratio such that the flux in said core coupled to said third winding remains substantially constant regardless the modulation of said modulated current.

3. The dynamic focussing circuit of claim 2 including means for coupling said transformer to said means for producing said raster scan current in a current driven mode.

4. The dynamic focussing circuit of claim 3 wherein said means for coupling the transformer in the current driven mode includes means for coupling said transformer first winding for receiving said modulated current, said capacitance means including a first capacitance coupled to said third winding to produce said dynamic focussing voltage in accordance with the value of current in said third winding as determined by the magnitude of flux in said core coupled to said third winding.

5. A circuit for producing a dynamic focussing voltage for a cathode ray tube raster scan beam deflection yoke, said tube having a face for receiving the scan beam for generating a raster scan picture on said face in response to the beam incident thereon, said circuit comprising:
   a diode modulation circuit for modulating a beam deflection current applied to said yoke for scanning said beam on the face of said tube to correct pin cushion distortion in said picture; and
   means responsive to said modulated current for producing a substantially unmodulated beam focussing voltage from said modulated current.

6. The circuit of claim 5 wherein said modulation circuit comprises a first parallel resonant circuit comprising a yoke coil in parallel with a first capacitance and a second parallel resonant circuit comprising an inductance in parallel with a second capacitance, the first resonant circuit being coupled in series with the second parallel resonant circuit, the first and second circuits having substantially the same resonance frequency value and including means for receiving a modulation signal for modulating the current through said yoke coil to effect said pin cushion correction.

7. The circuit of claim 6 wherein said means for producing a substantially unmodulated beam focussing voltage includes transformer means for receiving said modulated current, said transformer means including winding means for generating flux that exhibits substantially negligible modulation and means responsive to said flux for generating said beam focussing voltage.

8. The circuit of claim 7 wherein said transformer means includes a core and first, second and third windings on said core, said first winding for receiving said modulated current, said second winding being coupled to the first winding such that the flux in said core produced by said first and second windings is proportional to the turns ratio of said first and second windings, said turns ratio being such that the flux in said core is substantially constant in the presence of said modulated current, said means responsive to said flux comprising said third winding for producing a current in response to said core flux.

9. The circuit of claim 8 wherein said first winding is coupled between said yoke coil and said inductance, said inductance being coupled between the first winding and said second winding.

10. The circuit of claim 9 including damping resistance means coupled to the junction of one end of said first winding with the inductance and to the other end of said first winding.

11. The circuit of claim 9 including a coupling capacitor between the first and second windings at one end of the second winding, the other end of the second winding being connected to a reference potential.

12. A transformer comprising:
a core;
a first winding coupled to the core for receiving a first modulated input current of a first modulation value;
a second winding coupled to the core for receiving a second modulated input current of a second modulation value; and
a third winding coupled to the core for producing a substantially unmodulated output current corresponding to the combined flux generated in said core by said first and second windings, said first and second windings having a turns ratio and being arranged such that the output current manifests the algebraic sum of the fluxes created by the first and second windings to produce said unmodulated output current.

13. The transformer of claim 12 wherein the current of the first winding is applied to the second winding.

14. The transformer of claim 12 wherein said turns ratio is such that the flux coupled to said third winding is of substantially constant maximum amplitude.

15. The transformer of claim 12 wherein the turns ratio of said first and second windings is proportional to the value of said first and second modulation values.

16. The transformer of claim 15 including means for applying a periodic modulated ramp current to said first and second windings.

17. The transformer of claim 16 including means for generating a parabolic voltage from the current induced in said third winding, said turns ratio being such that the parabolic voltage has a constant maximum amplitude.

18. A circuit for generating a saw tooth waveform of constant maximum amplitude from a modulated saw tooth waveform comprising:
means for receiving said modulated saw tooth waveform; and
transformer means responsive to said modulated saw tooth waveform applied thereto for generating said saw tooth waveform of constant maximum value;
said transformer means comprising:
a core;
a first winding coupled to the core for receiving said modulated current of a first modulation value;
a second winding coupled to the core for receiving a second modulated current of a second modulation value; and
a third winding coupled to the core for producing an output current corresponding to the combined flux generated in said core by said first and second windings, said first and second windings having a turns ratio such that the output current manifests the algebraic sum of the fluxes created by the first and second windings.

19. The circuit of claim 18 wherein said turns ratio is such that the flux coupled to said third winding is of substantially constant maximum amplitude.

* * * * *